United States Patent
Choque et al.

(10) Patent No.: US 10,929,781 B1
(45) Date of Patent: Feb. 23, 2021

(54) SYSTEMS AND METHODS FOR DETERMINING TRAINING PARAMETERS FOR DIALOG GENERATION

(71) Applicant: Capital One Services, LLC, McLean, VA (US)

(72) Inventors: Omar Florez Choque, Oakland, CA (US); Erik Mueller, Chevy Chase, MD (US); Zachary Kulis, Arlington, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/669,866

(22) Filed: Oct. 31, 2019

(51) Int. Cl.
*G06N 20/00* (2019.01)
*G06F 3/16* (2006.01)

(52) U.S. Cl.
CPC ............. *G06N 20/00* (2019.01); *G06F 3/16* (2013.01)

(58) Field of Classification Search
CPC ...................................................... G06N 20/00
See application file for complete search history.

(56) References Cited

U.S. PATENT DOCUMENTS

| | | | |
|---|---|---|---|
| 6,839,671 B2 | 1/2005 | Attwater et al. | |
| 2009/0089137 A1* | 4/2009 | Minert | G06Q 10/06311 705/7.13 |
| 2014/0122619 A1* | 5/2014 | Duan | G06F 40/20 709/206 |
| 2017/0310613 A1 | 10/2017 | Lalji et al. | |
| 2018/0115643 A1* | 4/2018 | Skiba | H04L 51/02 |

OTHER PUBLICATIONS

X. Yang et al., "End-to-end joint learning of natural language understanding and dialogue manager", 2017 IEEE Int'l Conf. on Acoustics, Speech, and Signal Processing (ICASSP), IEEE, 2017, pp. 5690-5694. (Year: 2017).*

* cited by examiner

*Primary Examiner* — Vincent Gonzales
(74) *Attorney, Agent, or Firm* — Troutman Pepper Hamilton Sanders LLP; Christopher J. Forstner; John A. Morrissett

(57) ABSTRACT

A method for determining machine learning training parameters is disclosed. The method can include a processor receiving a first input. The processor may receive a first response to the first input, determine a first intent, and identify a first action. The processor can then determine first trainable parameter(s) and determine whether the first trainable parameter(s) is negative or positive. Further, the processor can update a training algorithm based on the first trainable parameter(s). The processor can then receive a second input and determine a second intent for the second input. The processor can also determine a second action for the second intent and transmit the second action to a user. The processor can then determine second trainable parameter(s) and determine whether the second trainable parameter(s) is positive or negative. Finally, the processor can further update the training algorithm based on the second trainable parameter(s).

19 Claims, 8 Drawing Sheets

SYSTEMS AND METHODS FOR DETERMINING TRAINING PARAMETERS FOR DIALOG GENERATION

FIELD OF THE INVENTION

The presently disclosed subject matter relates generally to methods and systems for determining training parameters from analyzing human interactions to improve artificial dialog systems to be more humanlike.

BACKGROUND

Presently, chatbots engaging in conversation with humans may continually learn from previous human to machine conversations. This training can involve labeling every portion of the human-machine dialogue. The dialog is generally a sequential process in which each interaction contains state transitions, entities, context, etc., each of which must be analyzed, identified, and labeled. These interactions when analyzed, may identify actions and goals present during a human-machine conversation. And, while these methods can be effective for improving future human-chatbot conversations, for example, they often involve large volumes of data, are time intensive, and/or tend to mimic human-machine dialogues rather than human-human dialogues. As a result, identifying actions and goals by analyzing human-human conversations may provide a more streamlined process for training a chatbot to interact in a more natural manner, similar to a human-human interaction—as opposed to a human-machine interaction. When these actions and goals from human-human conversations are provided to a chatbot, a more streamlined human-machine dialogue that better resembles a human-human dialogue may result. In addition, because these human-human interactions can be analyzed proactively, the time required to train new models for a chatbot is reduced when compared to, for example, using a starting assumption for a model and then using machine learning to train the chatbot solely on human-machine interactions.

Accordingly, there is a need for an improved method for training and refining human-chatbot conversations to be more human-like, less data intensive, and/or less time intensive.

SUMMARY

Aspects of the disclosed technology include systems and methods for determining trainable parameters for dialog generation. Consistent with the disclosed embodiments, the methods can include one or more user devices, processors, web servers, or application programming interfaces (APIs). In some cases, the systems and methods can include a processor receiving a first input from a first user and a first response to the first input from a second user. The processor can then determine a first intent for the first input. Determining the first intent can be based, at least in part, on the first input and the first response. The processor can also identify a first action based on the first input, the first response, and/or the first intent.

The method can also include the processor determining first trainable parameter(s) based on the first input, the first response, the first intent, and/or the first action. The method may also determine whether the first trainable parameter(s) is positive or negative. Further, the method may update a training algorithm based on the first trainable parameter(s).

The method can further include the processor receiving a second input from a third user. The processor can then determine a second intent for the second input based at least in part on the first positive trainable parameter(s) and/or the second input. The processor can also determine a second action for the second intent based at least in part on the second intent. The method can further include the processor transmitting the second action to the third user. The processor can then determine second trainable parameter(s) and whether the second trainable parameter(s) is positive or negative. The processor may determine the second trainable parameter(s) based on the second input and/or the second intent. The method may further include updating the training algorithm based on the second trainable parameter(s).

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, are incorporated into and constitute a portion of this disclosure, illustrate various implementations and aspects of the disclosed technology, and, together with the description, serve to explain the principles of the disclosed technology. In the drawings.

DETAILED DESCRIPTION

Figure 1:
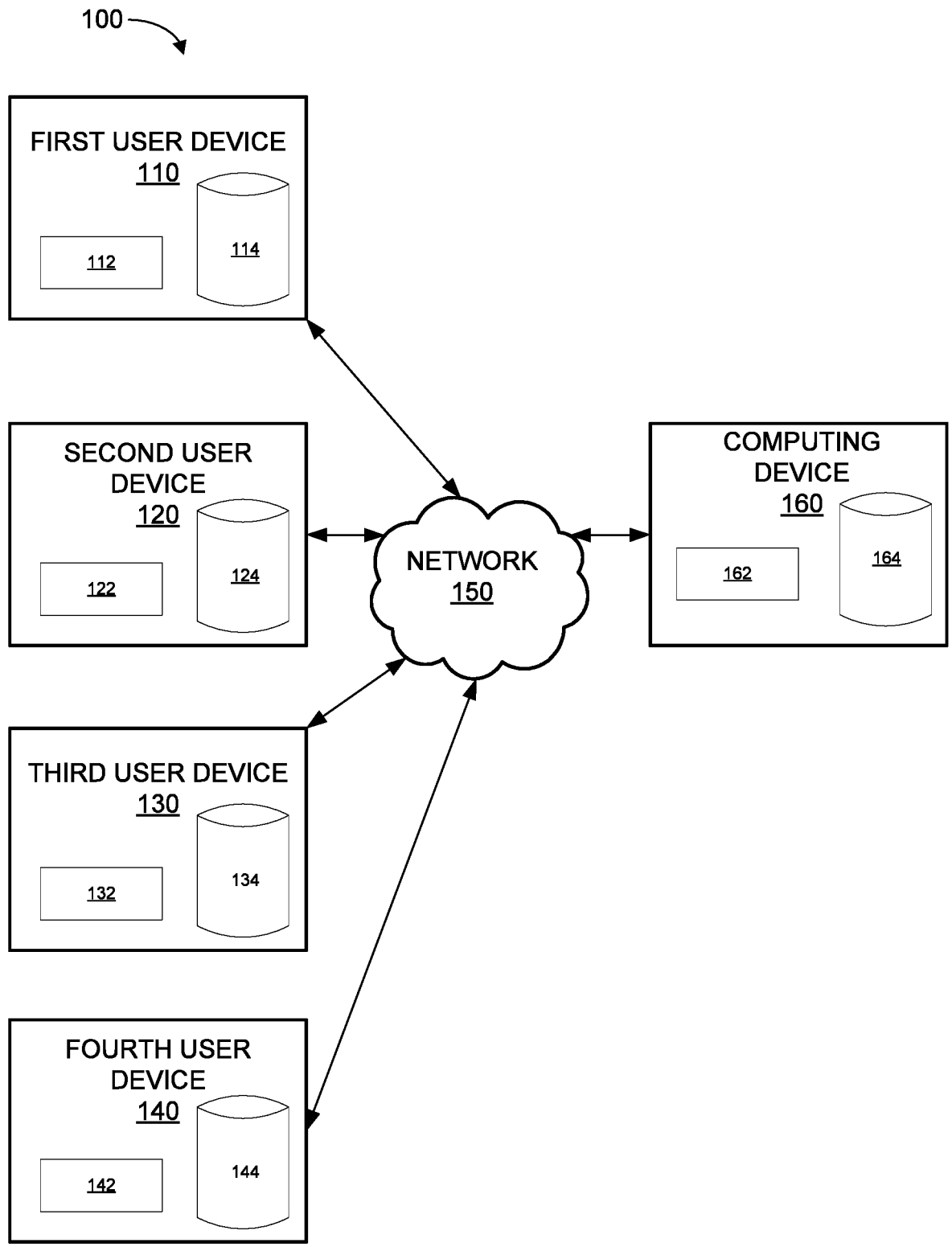
FIG. 1 is a diagram of an example system for training a chatbot, in accordance with some examples of the present disclosure.

Some implementations of the disclosed technology will be described more fully with reference to the accompanying drawings. This disclosed technology can be embodied in many different forms, however, and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein can include, but are not limited to, for example, components developed after development of the disclosed technology.

It is also to be understood that the mention of one or more method steps does not imply that the methods steps must be performed in a particular order or preclude the presence of additional method steps or intervening method steps between the steps expressly identified.

Examples of the present disclosure can include systems and methods that enable a computer (e.g., a chatbot) to learn appropriate responses from one or more human interactions (e.g., conversations from a live help desk or recorded therefrom). Based on a distribution of rewards learned from the human-to-human interactions, the computer system can more quickly learn (or be trained) to refine its engagements with humans in a human-chatbot interface. The computer system may learn from a human-to-human conversation, for example, to generate trainable parameters for future human-chatbot conversations. Thus, the system can automatically create a model based on analyzing one or more human-to-human conversations and then further refine the model based on analysis of ongoing human-to-chatbot interactions. Each portion of an interaction between a human and the chatbot can be rated as effective or ineffective, for example, and these ratings can be used to automatically and continually refine the model. Furthermore, based on the learning from human-human conversations, the system may more accurately determine trainable parameters in human-chatbot conversations.

In an example scenario, a computing device for training a model receives a conversation between two users (e.g., two humans). The conversation may be monitored during a live help desk call, for example, or may be analyzed from recordings. Regardless, the conversation may include a first input (e.g., dissatisfaction with a transaction being declined) from a caller, or a "first user." The conversation may also include a first response (e.g., "I apologize. Hopefully, I can help you with that.") provided by a customer service representative, for example, or a "second user," in response to the first input. The computing device can determine a first intent of the first user's input (e.g., dissatisfaction and the desire to have transactions approved). Next, the computing device can identify an action (e.g., the customer service representative increasing the user's daily spending limit or credit limit) associated with the first input, the first response, and/or the first intent.

The computing device can also detect in the conversation, one or more trainable parameters (e.g., a perceived sentiment, the results of a survey, a perceived customer satisfaction, etc.) provided by the first user and/or the second user, which can be positive or negative. If the first user responds with positive language (e.g., "Thanks for handling my problem so efficiently!), for example, and/or the second user responds favorably (e.g., "My pleasure, I'm glad I could help!"), each of these responses can be considered a positive trainable parameter—i.e., the interaction between the first user and the second user went well and the chatbot should emulate this behavior. If, on the other hand, the first user responds with, "That doesn't solve my problem." then a particular action may be considered a negative training parameter. If a particular response to a particular problem consistently results in a negative training parameter, the chatbot will learn not to emulate this behavior.

The computing device can then determine the effectiveness of an action based on, for example, one or more of the interactions in the conversation—e.g., how the first user responds to the response from the second user (in this example, the action). When the computing device determines the action to be effective, it can generate another trainable parameter having a positive value. When the computing device determines the action to be ineffective, it can generate a trainable parameter having a negative value. The trainable parameters can help the computing device train a dialog model used for conducting future human-chatbot conversations. And, since each interaction provides data—either positive or negative—the number of trainable parameters that can be gleaned from each interaction is increased. This, in turn, significantly reduces the amount of time and "back-and-forth" required to create an accurate model for training a chatbot to provide the same, positive user experience.

In a future human-chatbot conversation, the computing device can receive a second input from a third user (e.g., "I would like to know my balance."). Using the trained model, and based on previous trainable parameters and/or the second input, the computing device can then determine an intent or sentiment of the second input. Based on the intent, for example, the computing device can determine a second action (e.g., a response to the query). The computing device can respond by transmitting the second action (e.g., "Your balance is $533.37.") to the third user. The third user can then provide a third input from which the system can determine yet another trainable parameter (e.g., a perceived sentiment, the answers from a survey, perceived customer satisfaction ("Thanks!"), etc.) representing the quality of the second action to the computing device. When the computing device determines that the second action is effective, it can generate a positive trainable parameter. The trainable parameters can be further implemented to train the dialog model to provide further enhancements to future chatbot-human conversations.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 shows an example system 100 that can implement certain aspects of the present disclosure. The components and arrangements shown in FIG. 1 are not intended to limit the disclosed embodiments as the components used to implement the disclosed processes and features can vary. As shown in FIG. 1, in some implementations the system 100 can include a first user device 110, a second user device 120, a third user device 130, a fourth user device 140, each of which can include respective processors 112, 122, 132 and 142 and respective databases 114, 124, 134, and 144. The system 100 can also include a computing device 160, which can include a processor 162, a database 164, and a network 150. As non-limiting examples, the user devices 110, 120, 130, 140 can be personal computers, smartphones, laptop computers, tablets, or other personal computing devices. The network 150 can include a network of interconnected computing devices such as, for example, an intranet, a cellular network, or the Internet. And, while shown as a single device in FIG. 1, the computing device 160 can include one or more physical or logical devices (e.g., servers), cloud servers, remote servers, etc. An example computer architecture that can be used to implement the user devices 110, 120, 130, 140 and the computing device 160 is described below with reference to FIG. 6.

In certain implementations according to the present disclosure, the user devices 110, 120, 130, 140 can perform the same or similar actions. A first user (e.g., bank customer) may use the first user device 110 to conduct a conversation with a second user (e.g., bank representative) who uses the second user device 120. The first user, via the first user device 110, may transmit a first input (e.g., frustration with a declined transaction) to the second user device 120. In some embodiments, the computing device 160 may serve as an intermediary between the first user device 110 and the second user device 120. Therefore, in a conversation between the first user and the second user, the first user device 110 and the second user device 120 may transmit communication (e.g., first input, first response) to the computing device 160, which may relay the communication to the intended user device. Alternately, the user devices (e.g., first user device 110 and second user device 120) may communicate directly with one another by transmitting the communication to the other user device.

The first input can include a greeting, a question, a verbal prompt, etc. The first input can originate from the first user and can be a portion of an audio conversation. The audio conversation can be between the first user and the second user. In some embodiments, the first input can be a recording of at least a portion of the audio conversation. In other embodiments, the first input can be a real-time transmission of a portion of an audio conversation.

The first user device 110 can store the first input within the database 114. Further, the first user device 120 can receive a first response to the first input from the second user device 120. Similar to the first input described above, the first response can be a portion of an audio conversation. The first user device 110 can perform a first action based at least in part on the first response. The first action can include a variety functions including, for example, updating the second user's account information, resetting the second user's password, recommending a credit card, uttering a greeting, or seeking clarification.

The computing device 160 executing the training algorithm can assess each individual interaction (e.g., first input, first response, and/or first action) between the users to determine trainable parameters. In other words, the computing device 160 can analyze the actual words used by the users (e.g., "Thank you!" vs. "No, that's not what I said."), the tone of the users (e.g., an increase in frequency or volume), how long a user took to respond, the number of back-and-forths in the conversation, etc. The trainable parameters may be used as inputs to the training algorithm that instruct the training algorithm how to communicate with a human in a human-chatbot scenario. The computing device 160 can further determine whether the trainable parameters are positive or negative. A positive trainable parameter, for example, may be used to instruct the chatbot how to properly respond to a human. Conversely, a negative trainable parameter may be used to in a manner that prevents the chatbot from responding to a human in an unsatisfactory way.

As discussed below, the trainable parameters may be based on, for example, a survey filled out by a user (e.g., second user of the second user device 120), which may be received by the computing device 160 and/or the first user device 120. A survey can be one or more questions directed to the second user related to the overall experience with the first user. The survey can also include an open-ended feedback provided by the second user. In some embodiments, after a plurality of exchanges of inputs, responses, and actions, a sum of the trainable parameters may be determined that is cumulative. According to some embodiments, the sum of the trainable parameters may be the overall experience of the user. For instance, a sum of the trainable parameters may indicate satisfaction of the user despite at least one of the trainable parameters indicating a negative experience.

Turning to the second user device 120, the second user device 120 can receive the first input from the first user device 110. The second user device 120 can transmit the first response to the first user device 110 and/or the computing device 160. The first response can be a request for the performance of a certain action that may be generated by the second user. A reply to the first input can be considered a consequence of the first input and thus, the first response. If the first input is, for example, "Good morning, how can I help you?", it influences the user to utter the first response of "Good morning, I want to check my balance." In some embodiments, the first response can be an indication of the accuracy of the first input. The second user device 120 can receive an indication of the performance of the first action associated with the first response. For example, the first user can indicate that a request for updated account information has been successfully performed. Accordingly, the computing device 160 can use this exchange as a trainable parameter having a positive value.

The third user device may be used by a third user who engages in a human-chatbot conversation—e.g., conversation between the computing device 160 and the third user device 130. The third user device 130 can transmit a second input to the computing device 160. Similar to the first input, the second input can be a real-time transmission or a recording of at least a portion of an audio conversation. The second input can be a request for the performance of a certain function. The third user device 130 can receive a second action from the computing device 160. The second action can be an indication of the performance of a second action associated with the second input, i.e., the computing device 160 may determine a trainable parameter based on this exchange.

Aspects of the fourth user device 140 can be substantially similar to the details disclosed regarding the third user device 130. The fourth user device 140 may be used by a fourth user in, for example, a human-chatbot conversation where the chatbot has been trained by both human-human interaction(s) and human-chatbot interaction(s). The fourth user device 140 can transmit a third input to the computing device 160. The third input can be a real-time transmission or a recording of at least a portion of an audio conversation. The third input can be a request for performance of a certain function. The fourth user device 140 can receive a third action from the computing device 160. The third action can be an indication of performance associated with the third input. Based on the third action and/or the third input, the computing device 160 may determine one or more trainable parameters.

Turning to the computing device 160, the computing device 160 may operate as a chatbot, or in some embodiments, the computing device 160 may determine training parameters and provide them to a chatbot. In the latter instances, the chatbot may interact with a human based on the learning derived from the computing device 160. According to embodiments consistent with the former scenario, the computing device 160 receives the first input from the first user device 110. The computing device 160 can also receive, from the second user device 120, the first response to the first input. In some embodiments, the first input and the first response can be received from the same device. As a non-limiting example, when the communication between the first user and the second user is a recorded audio conversation, the first user can utter the first input to the second user and the second user can utter the first response. In some examples, the recording of these exchanges can be provided to the computing device 160 by a user device (e.g., one of the user devices 110, 120, 130, 140). In other examples, the computing device 160 can receive recorded, or real-time, user interactions recorded and/or sent from a call center. The computing device 160 may parse the audio conversation into a plurality of parts including, but not limited to, the first input, the first response, and the first action. In some examples, the computing device 160 can analyze the audio from customer service calls directly. In some examples, the actual words of the conversation can be parsed from the conversation using voice-to-text processing, for example, to identify words with positive and negative intent, etc. In other examples, the tone, frequency, volume, and other characteristics of the audio itself can be directly analyzed to identify when a customer is excited vs. when a customer is upset, etc.

In some embodiments, the computing device 160 can receive the human interactions in text form. Computing device 160 can perform a named entity recognition process on the text based human interactions. The named entity recognition process can include a step in which a semantic label is assigned to strings in the text (or an audio entry converted to text) that are related to pre-defined categories such as the person names, organizations, locations, medical codes, etc. Further, based on the pre-defined categories, the computing device 160 can associate the strings with the first input, the first response, and/or the first action. The computing device 160 can then determine the first intent for the first input based at least in part on the first input and/or the first response. In some embodiments, the computing device 160 can determine the first intent by applying a training algorithm to the first input. As an output of the training algorithm, the computing device 160 can receive a distribution of probabilities over a possible set of intents. The computing device 160 can then determine the possible intent with the highest probability and perform a prediction of the type of intent and assign that type of intent to the first input.

The first intent can be an underlying goal that the first user and/or second user has in mind during at least a portion of a conversation (e.g., check balance, withdraw money, update profile). The computing device 160 can further identify the first action based on the first input, the first response, and/or the first intent. The computing device 160 can store data including the first action, the first input, the first response, the first intent, and/or the trainable parameter(s) within the database 164.

The computing device 160 can determine trainable parameter(s) based on various portions of a conversation (e.g., first input, first response, and/or first action). Further, the computing device 160 may determine whether a trainable parameter is positive or negative based at least in part on the actual phrase uttered and/or the tone of the phrase. For example, the computing device 160 can pre-assign a numerical value for each level of tone (e.g., enthusiastic, respectful, formal, angry). Additionally, the computing device 160 can pre-assign a numerical value for the type of phrase uttered (e.g., an expression of gratitude, satisfaction, dissatisfaction). When the numerical value of the trainable parameter is above a first median numerical value, the computing device 160 may determine that the trainable parameter is positive. Conversely, the computing device 160 the trainable parameter is negative based at least in part on the numerical value of being below the first median numerical value.

Referring to the survey mentioned above, the computing device 160 may receive a survey from one of the users, which may be used as one or more trainable parameters. The computing device 160 can assign a value to each of one or more entries in the survey. According to some embodiments, the user may be prompted to participate in a survey at the end of a conversation. The survey may seek to determine aspects of the user's experience and/or the user's overall experience by questioning the user. The questions may require "yes/no" responses, fill in the blank answers, and/or the like. Further, the computing device 160 can generate a composite score based on a sum of the values of each of the one or more entries. Each response in the survey may be used as a separate trainable parameter or the computing device 160 can tally one or more responses to one or more entries of the survey to compare the composite score to a numeral value to determine whether the trainable parameter is positive or negative. Therefore, a composite score above the numerical value may be associated with a positive trainable parameter, and conversely, a composite score below the numerical value may be associated with a negative trainable parameter.

The computing device 160 can also determine whether the trainable parameter is positive or negative based on feedback provided in a relevant field. The contents of the field can be evaluated to determine user satisfaction. Evaluating the contents of the field can include comparing words and/or phrases in the field, for example, to pre-defined keywords for a match. Each pre-defined keyword may have a pre-assigned value. The computing device 160 can generate a composite score, for example, based on a sum of the values of each of the matched pre-defined keywords.

Further, the computing device 160 can also determine the amount of time between the first input and the first response. Based on the amount of time between the first input and the first response, the computing device 160 can determine a trainable parameter. For example, an amount of time less than a pre-assigned amount of time can be associated with a positive customer user experience. Shorter times between the first input and the first response may be associated with higher customer satisfaction because, for example, when the chatbot accurately identifies the user's issue, the user may respond more quickly. Meanwhile, longer times between the first input and the first response may indicate customer dissatisfaction because unfavorable responses may require more thought and/or involve the user hesitating before responding. Therefore, the computing device 160 can determine whether the trainable parameter is positive based at least in part on the amount of time between the first input and the first response being shorter than a predetermined amount of time. Conversely, the computing device 160 can determine the trainable parameter is negative based at least in part on the amount of time between the first input and the first response being greater than the predetermined amount of time.

The computing device 160 can also store as data the trainable parameter(s) within the database 164. The trainable parameters (e.g., one or more first trainable parameters, one or more second trainable parameters, and/or one or more third trainable parameters) may be integral to the training algorithm. Of course, the training algorithm may be a machine learning algorithm. The trainable parameters may be used by a function and/or an object of the algorithm to tailor the initial rules included within the algorithm. These rules may include identification of the parts of the conversation (e.g., inputs, responses intents, and/or actions). Ultimately, the trainable parameters change the algorithm and improve the efficacy and/or efficiency of the algorithm, i.e., using human-human interactions to provide human-chatbot interactions that more closely resemble human-human interactions.

According to some embodiments, the computing device 160 can determine a trainable parameter based on whether the user engages in the conversation without repeating the same or similar utterances. In particular, the computing device 160 may determine certain repeated utterances as negative, and therefore determining a trainable parameter having a negative value. For example, a repeated second input may lead to a determination of a trainable parameter with a negative value because it may indicate the user's inability to effectively communicate with the chatbot—e.g., the customer repeatedly saying "No, check balance." On the other hand, when the computing device 160 determines the repeated utterance indicates a positive customer experience, for example, "Yes, that's great! That's great!," the computing device 160 may determine a trainable parameter with a positive value because the user's repeated utterance conveys excitement and/or satisfaction. Additionally, in the absence of multiple instances of an utterance, the computing device 160 may determine a trainable parameter having a positive value.

Further, the computing device 160 can determine an overall effectiveness score based on whether users repeatedly use the system. In some embodiments, the computing device 160 may receive user identification data from one of the user devices 110, 120, 130, 140 and compare the user identification data to stored user identification data. A match between the stored user identification data and the user identification data indicates to the computing device 160 that the user is a repeat user. Additionally, the computing device 160 may calculate the number of uses of the system per user and determine an average number of uses of the system per user. The computing device 160 can associate the average number of uses per user to a pre-determined range of uses, with each range of uses having a numerical value. When the numerical value is above a pre-determined threshold, the computing device 160 can determine the overall effectiveness score to be high. Alternately, when the numerical value is below the pre-determined threshold, the computing device 160 can determine the overall effectiveness score to be low.

In some embodiments, the one or more first trainable parameter(s) can include, as data, labeled text versions of the first input and/or one or more previous first inputs, the first response and/or one or more previous first responses, the first intent and/or one or more previous first intents, the first action and/or one or more previous first actions, one or more previous first trainable parameters, and/or one or more instructions. The one or more instructions can be compiled code, for example, and can be used by the computing device 160 for future human-chatbot interactions. Similarly, the one or more second parameters and the one or more third parameters can include respective second and third inputs, respective second and third responses, respective second and third intents, and/or respective second and third actions, as well previous versions of the aforementioned parts of a conversation.

The system can use a stochastic gradient descent, for example, where the one or more first trainable parameters is a weight of an artificial neural network. The weight can be a numeric matrix representing the level of interaction between consecutive neurons in an algorithm. The weight can be numerically optimized when computing the gradient of a function that quantifies the error.

Figure 2:
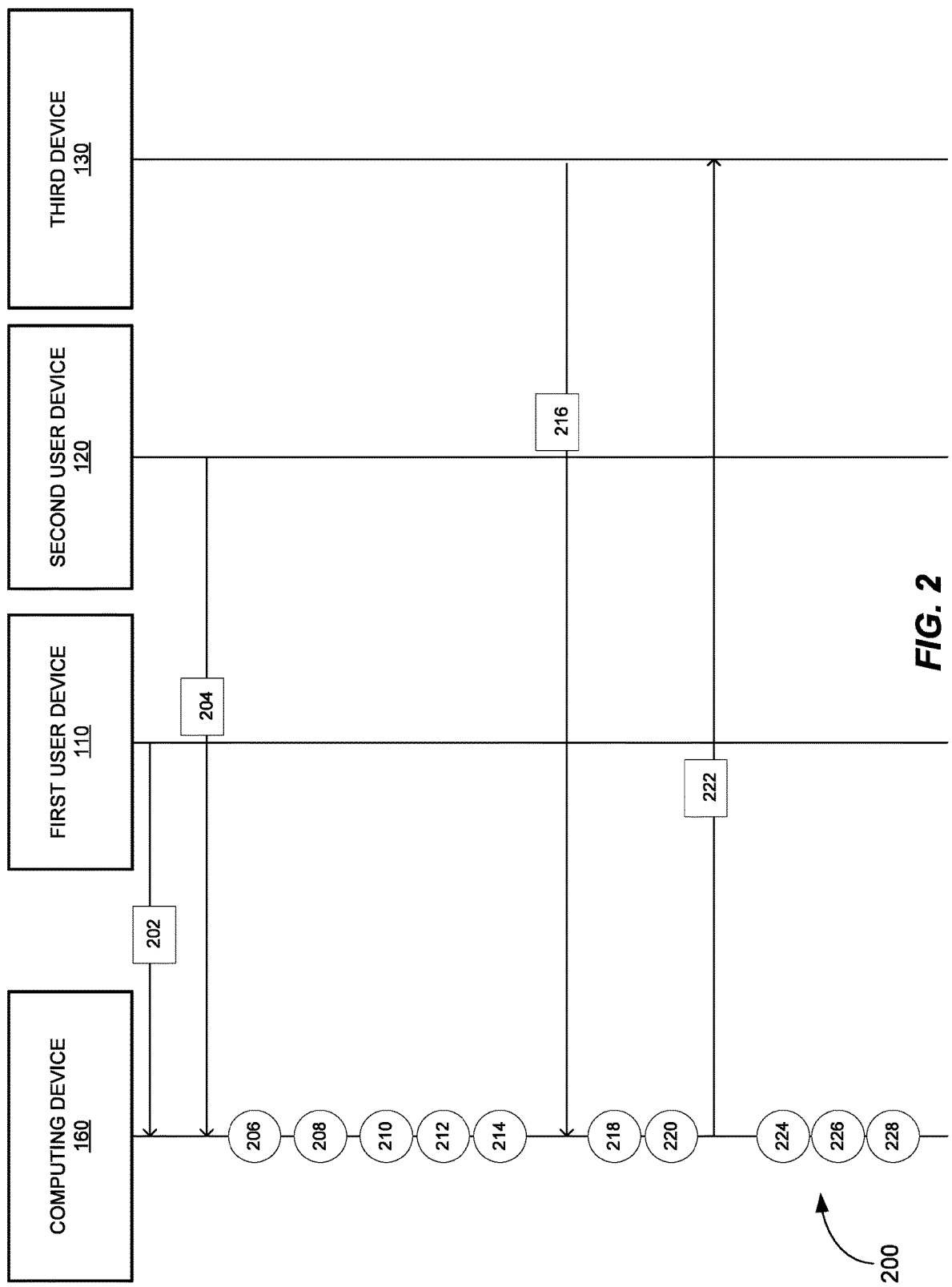
FIG. 2 is an example timing diagram for training a chatbot, in accordance with some examples of the present disclosure.

FIG. 2 illustrates an example timing diagram for determining training parameters. The diagram illustrates the computing device 160 learning how a conversation between humans, via the first user device 110 and the second user device 120, is conducted. Based on this learning, the computing device 160 communicates with a human via the third user device 130. According to some embodiments, at 202, the first user device 110 can transmit the first input to the computing device 160. The first input can be uttered by the first user, and the first response can be uttered by the second user. Both the first input and the first response can be a portion of an audio conversation, for example, which may be recorded or live. At 204, the computing device 160 receives the first response to the first input from the second user device 120.

At 206, the computing device 160 can determine the first intent for the first input. Determining the first intent can be based on the first input and/or the first response. The first intent can be an underlying goal the first user desires to accomplish through a conversation with the second user. At 208, based on the first input, the first response, and/or the first intent, the computing device 160 identifies the first action. The first action can be a task to be performed (e.g., updating user account information, resetting the user's password, recommending a credit card, uttering a greeting, seeking clarification, etc.).

At 210, the computing device 160 can determine one or more first trainable parameters based on the first input, the first response, the first action, and/or the first intent. In some embodiments, the computing device 160 can identify certain phrases (e.g., "thank you!"), determine the tone of the second user's first response, identify requests for further assistance (e.g., asking for a manager) to determine the one or more trainable parameters.

The computing device 160 can determine whether the one or more first trainable parameters are positive or negative at 212. The one or more first trainable parameters based on the phrase "great job" for example, can be determined to be one or more first trainable parameters having a positive value, for example, while phrases that include "not happy," "late," "disappointed," etc. may be determined to be one or more first parameters having a negative value. Determining the value of the one or more first trainable parameters can be equally evaluated based on, for example, the actual phrase uttered by the user, the tone of the user's utterance, and/or requests by the user for further assistance.

At 214, the computing device 160 can update the training algorithm based on the one or more first trainable parameters. Therefore, in future exchanges, when the one or more first trainable parameters are positive, the computing device 160 may be trained to perform similarly to the exchanges leading to the determination of the one or more trainable parameters—e.g., the chatbot may respond to an input in a manner similar to the action that led to the one or more first trainable parameters. As an example, when the system receives, for example, "Account locked!" as an input, and unlocking the account is performed as an action, the system may unlock the account when receiving the same or similar inputs.

As used herein, a second input, a second intent, a second action, and one or more second trainable parameters can be the same or substantially similar to a first input, a first intent, a first action, and one or more first trainable parameters, respectively. At 216, the third user device 130 can transmit the second input from the third user to the computing device 160. At 218, based at least in part on the one or more first positive parameters and the second input, the computing device 160 can determine the second intent for the second input. At 220, based at least in part on the second intent, the computing device 160 can determine the second action. At 222, the computing device 160 can transmit the second action (or an indication thereof) to the third user device 130. For example, after resetting a user's password, the computing device 160 can notify the user that his password has been reset.

Steps 224-228 can be performed substantially the same as steps 210-214 above. Similar to determining the one or more first trainable parameters, at 224, the computing device 160 can determine one or more second trainable parameters based on the second input and/or the second intent. At 226, the computing device 160 can determine whether the one or more second trainable parameters are positive or negative. At 228, the computing device 160 can update the training algorithm based on the one or more second trainable parameters. Therefore, when the one or more second trainable parameters are positive the training algorithm will emulate the exchanges involved in the conversation. Conversely, when the one or more second trainable parameters are negative the training algorithm will avoid exchanges similar to those involved in the conversation.

Figure 3:
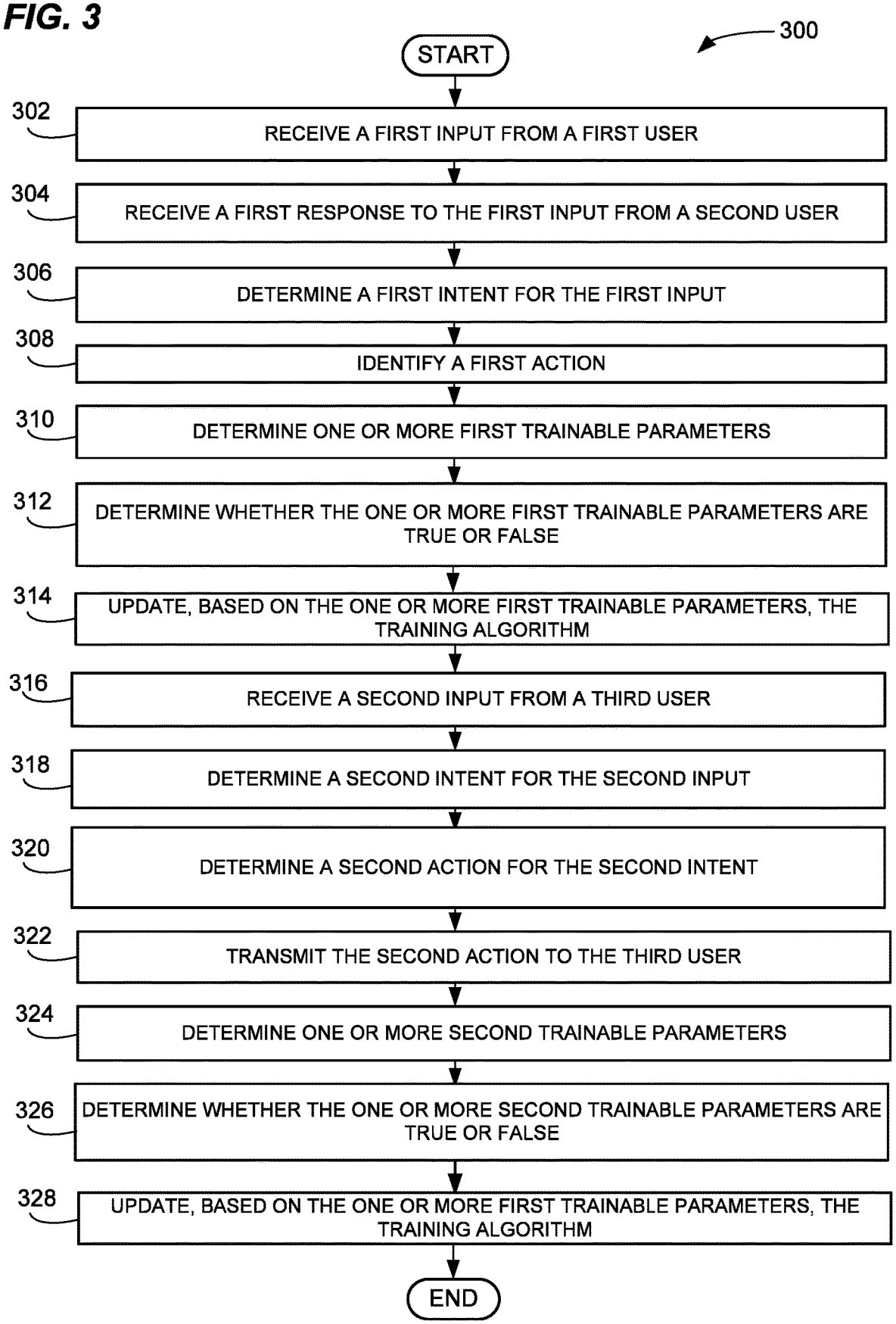
FIG. 3 is a flow chart of an example of a method for training a chatbot based on a human-human interaction, in accordance with some examples of the present disclosure.

FIG. 3 illustrates an example flow chart of an example of a method for determining training parameters. The flow chart illustrates learning how conversations between humans work, applying the learning to conduct a human-chatbot conversation, and further refining the learning based on the human-chatbot conversation. At 302, the processor 162 can receive the first input from the first user. The first user can transmit the first input to the processor 162 from the first user device 110. In some embodiments, the processor 162 can receive the first input and the first response from one device. In those embodiments, the first input and the first response can be received as a recorded conversation or as a transcript of a conversation. At 304, the processor 162 receive the first response to the first input from the second user. The second user can transmit the first response to the processor 162 from the second user device 120. At 306, the processor 162 determines the first intent for the first input. Determining the first intent can be based on the first input and/or the first response. At 308, the processor 162 may identify the first action. The first action can be identified based on the first input, the first response, and/or the first intent. At 310, the processor 162 may determine the one or more first trainable parameters based on the first response, the first action, and/or the first intent. Therefore, the processor 162 executing the training algorithm analyzes the portions of the conversation to determine whether any of the portions of the conversation can be used to train the chatbot in future conversations.

At 312, the processor 162 may determine whether the one or more first trainable parameters are positive or negative. At 314, the processor 162 can update the training algorithm based on the one or more first trainable parameters. In future conversations, for example, when the one or more first trainable parameters are positive, the algorithm may be updated to transmit the same or similar first response after receiving the same or similar first input. Furthermore, the training algorithm may be updated to transmit the same or similar first action after determining the same or similar intent. Conversely, in future conversations, when the one or more first trainable parameters are negative, the algorithm may be updated to discontinue transmitting the same or similar first response after receiving the same or similar first input. Furthermore, the training algorithm may be updated to discontinue transmitting the same or similar first action.

At 316, the processor 162 may receive the second input from the third user. The third user can transmit the second from the third user device 130 and to the processor 162. At 318, the processor 162 may determine the second intent for the second input. Determining the second intent can be based on the one or more first trainable parameters and/or the second input. At 320, the processor 162 may determine the second action for the second intent. Determining the second action can be based at least in part on the second intent. At 322, the processor 162 transmits the second action to the third user via the third user device 130. At 324, the processor 162 may determine the one or more second trainable parameters based on the second input, the second action, and/or the second intent. At 326, the processor 162 may determine whether the one or more second trainable parameters are positive or negative. At 328, the processor 162 may further update the training algorithm based on the one or more second trainable parameters. Of course, updating the training algorithm based on the one or more second trainable parameters may be similar to updating the training algorithm based on the one or more first trainable parameters mentioned above.

Figure 4A:
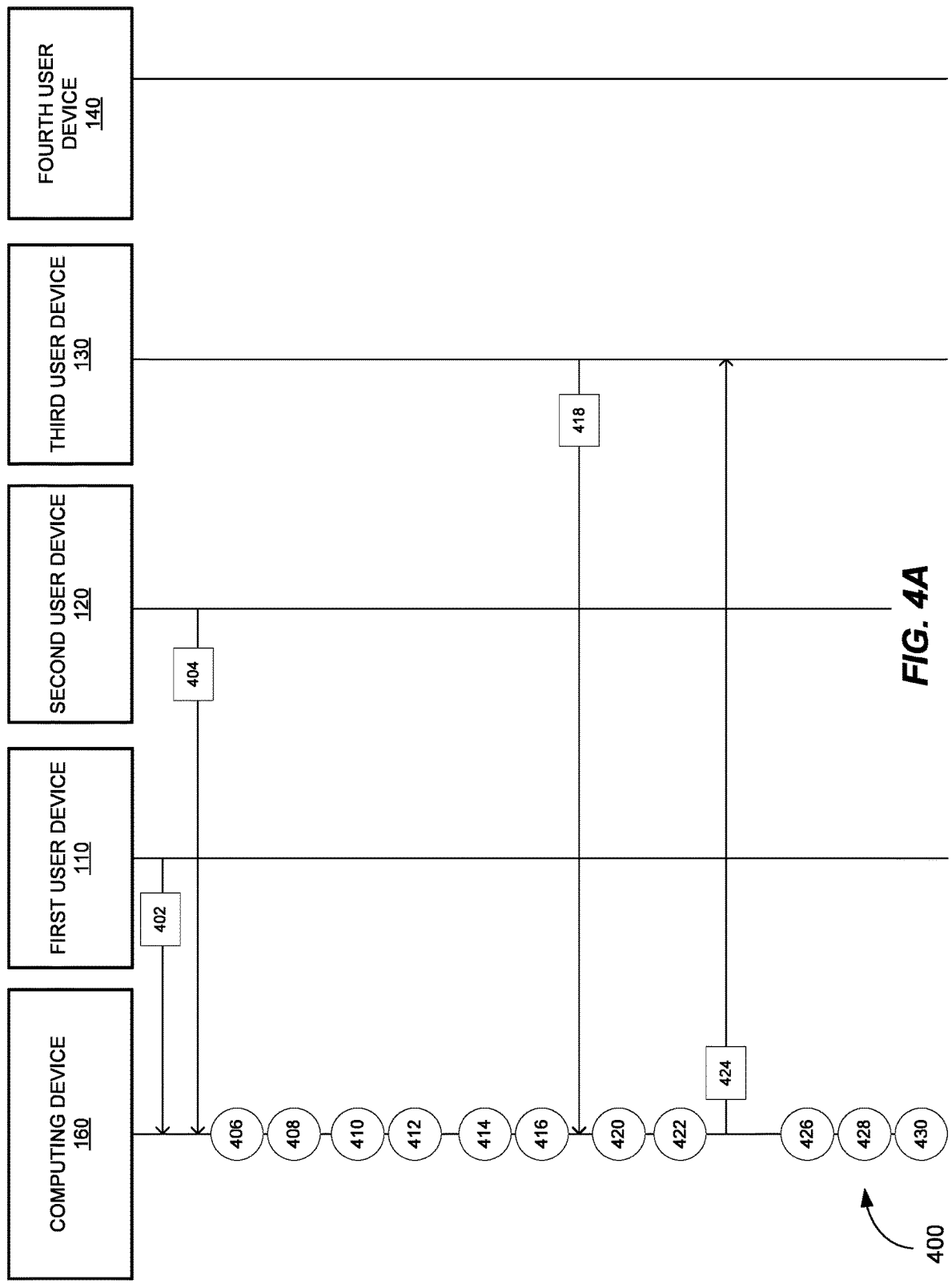
FIGS. 4A-B are additional example timing diagrams for training a chatbot based on a human-human interaction and a subsequent human-chatbot interaction, in accordance with some examples of the present disclosure.
Figure 4B:
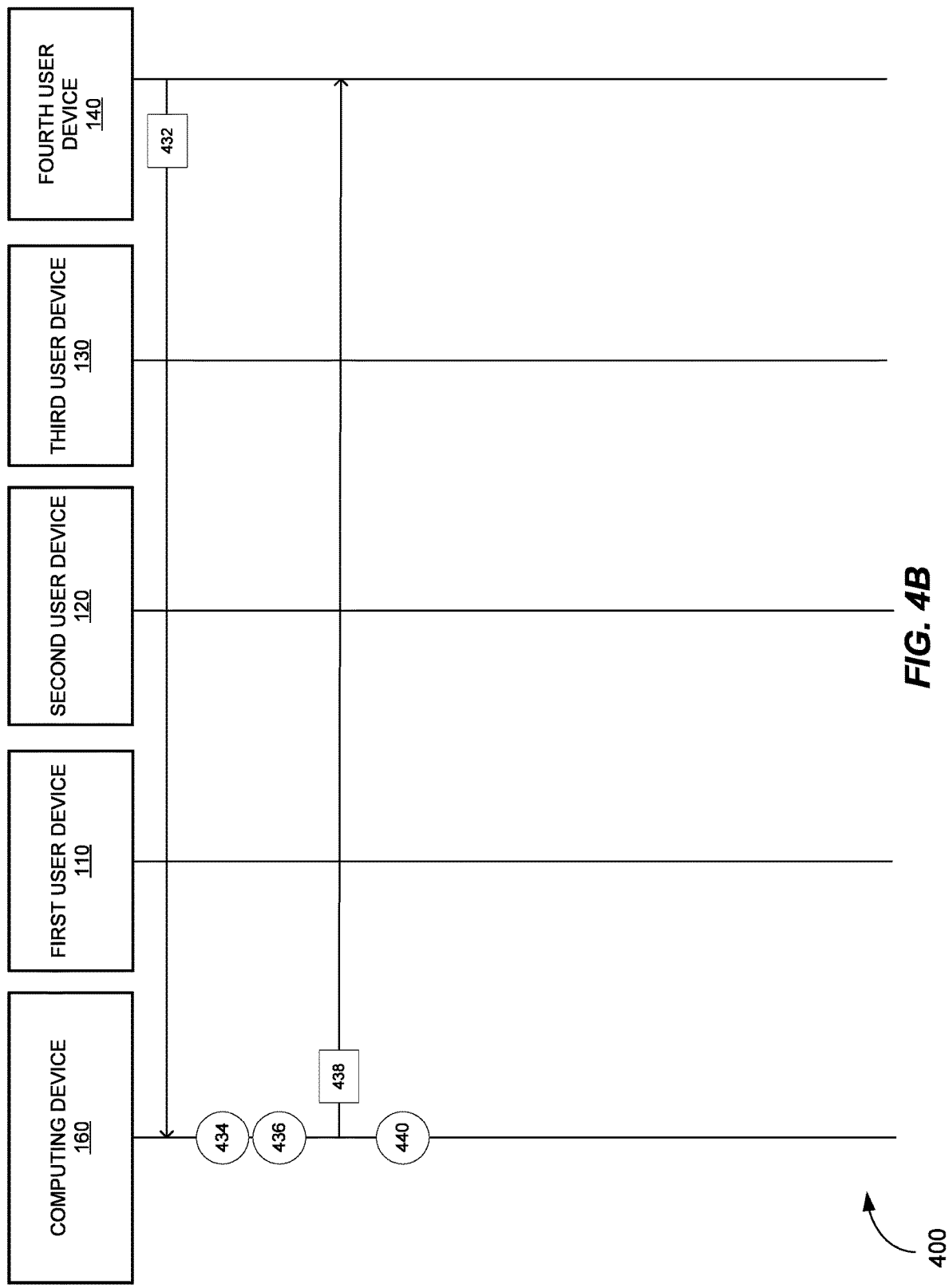

FIGS. 4A-B illustrates example timing diagrams for determining training parameters. FIG. 4A illustrates steps 402-430 and FIG. 4B illustrates steps 432-440. The timing diagram illustrates multiple rounds of learning. First, the computing device 160 learns how conversation between humans works, and then applies the learning to conduct a human-chatbot conversation. The computing device 160 can also refine the learning based on the human-chatbot conversation and apply the learning in a subsequent human-chatbot conversation. Referring to FIG. 4A, the method includes: receiving, by the computing device 160, the first input from the first user device 110 at 402; receiving, by the computing device 160, the first response to the first input from the second user device 120 at 404; determining, by the computing device 160, the first intent for the first input at 406; identifying, by the computing device 160, the first action at 408; determining, by the computing device 160, the one or more first trainable parameters at 410; and determining, by the computer device 160, whether the one or more first trainable parameters are positive or negative at 412. These features can be substantially similar to the corresponding features described above with reference to FIG. 2.

At 414, the computing device 160 stores, as data, the first action, the first input, the first response, the first intent, and/or the one or more first trainable parameters. At 416, the computing device 160 updates, based on the one or more first trainable parameters, the training algorithm. At 418, the computing device 160 receives the second input from the third user device 130. At 420, the computing device 160 determines the second intent for the second input. Determining the second intent can be based at least in part on the one or more first trainable parameters and/or the second input. At 422, based on the one or more first trainable parameters, the second input, and/or the second intent, the computing device 160 generates the second action. At 424, the computing device 160 transmits the second action to the third user device 130. As mentioned above, transmitting the second action can be an indication of performance of the second action. At 426, the computing device 160 can determine, based on the second input, the second action, and/or the second intent, one or more second trainable parameters.

At 428, the computing device 160 determines whether the one or more second trainable parameters is negative or positive. At 430, the computing device 160 updates the training algorithm based on the one or more second trainable parameters.

Referring to FIG. 4B, at 432, the fourth user device 140 transmits the third input to the computing device 160. At 434, the computing device 160 executing the training algorithm determines the third intent for the third input based at least in part on the one or more first trainable parameters, the one or more second trainable parameters, and/or the third input. At 436, the computing device 160 determines the third action based on the third intent. At 438, the computing device 160 transmits the third action to the fourth user device 140. At 440, the computing device 160 determines one or more third trainable parameters based at least in part on the third input, the third action, and/or the third intent.

Figure 5:
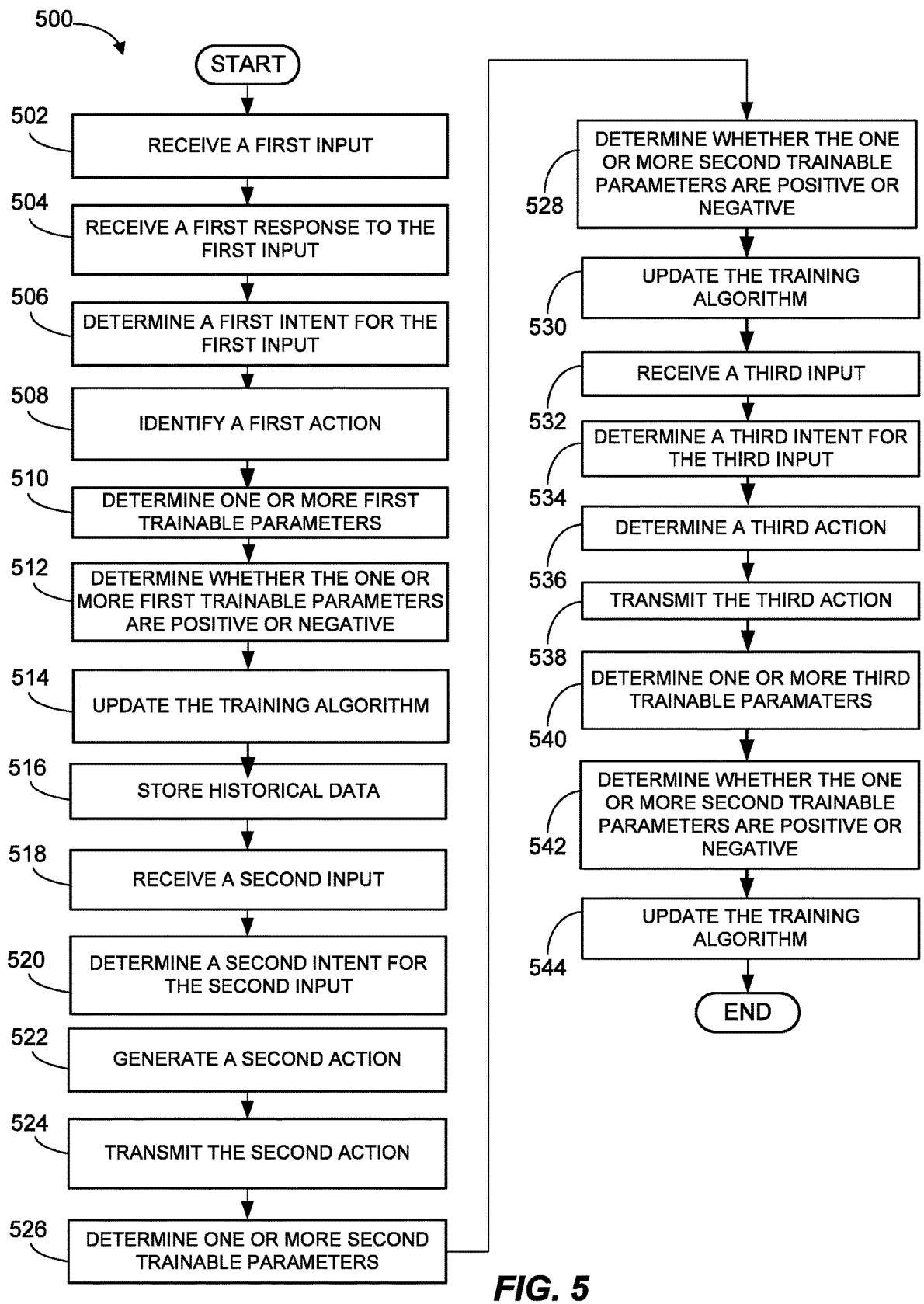
FIG. 5 is an example flow chart of method for training a chatbot based on a human-human interaction and a subsequent human-chatbot interaction, in accordance with some examples of the present disclosure.

FIG. 5 illustrates an example flow chart of a method for determining training parameters. Similar to FIG. 4, the timing diagram shown in FIG. 5 illustrates multiple rounds of learning including: learning how conversation between humans work, applying the learning to conduct a human-chatbot conversation, further refining the learning based on the human-chatbot conversation, and applying the learning in a subsequent human-chatbot conversation. Referring to FIG. 5, the method includes: receiving, by the computing device 160, the first input from the first user at 502; receiving, by the computing device 160, the first response to the first input from the second user at 504; determining, by the computing device 160, the first intent for the first input at 506; identifying, by the computing device 160, the first action at 508; determining, by the computing device 160, the one or more first trainable parameters at 510; determining, by the computing device 160, the whether the one or more first trainable parameters are positive or negative at 512; updating, by the computing device 160, the training algorithm at 514; and storing, as historical data, the first input, the first response, the first intent, one or more instructions, the one or more first trainable parameters, and/or the first action at 516. These features can be substantially similar to the corresponding features described above with reference to FIG. 3.

Steps 518-530 can involve a human-chatbot conversation. The human can communicate via the third user device and the chatbot can communicate via the computing device 160. At 518, the computing device 160 receives the second input. The second input can be transmitted from the third user device 130. At 520, the computing device 160 determines the second intent for the second input based at least in part on the one or more first trainable parameters and/or the second input. At 522, the computing device 160 generates the second action based on one or more of the one or more first trainable parameters, the second input, and/or the second intent. At 524, the computing device 160 transmits the second action to the third user device 130. At 526, the computing device 160 determines the one or more second trainable parameters based on the second input, the second action, and/or the second intent.

At 528, the computing device 160 determines whether the one or more second trainable parameters are positive or negative. At 530, the computing device 160 updates the training algorithm based on the one or more second trainable parameters. Steps 532-546 can involve a human-chatbot conversation occurring to subsequent to another human-chatbot conversation. At 532, the computing device 160 receives the third input. The third input can be transmitted from the fourth user device 140. At 534, the computing device 160 determines the third intent for the third input based at least in part on the one or more first trainable parameters, the one or more second trainable parameters, and/or and the third input. At 536, the computing device 160 determines the third action based on the third intent. At 538, the computing device 160 transmits the third action to the fourth user device 140. At 540, the computing device 160 determines the one or more third trainable parameters. At 542, the computing device 160 determines whether the one or more third trainable parameters are positive or negative. Finally, at 544, the computing device 160 updates the training algorithm based on the one or more third trainable parameters.

Figure 6:
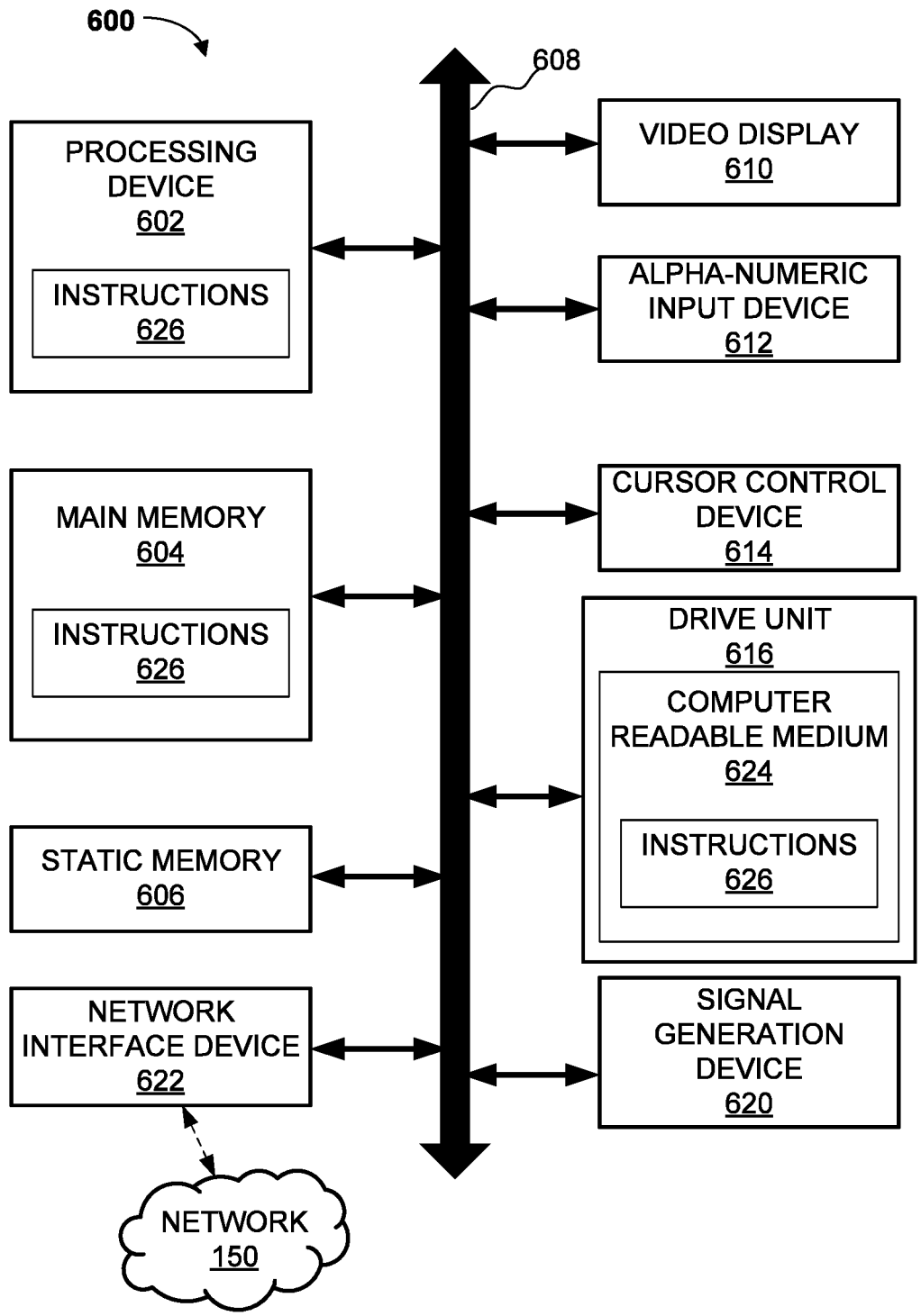
FIG. 6 is a block diagram of an example computer system for determining training parameters, in accordance with some examples of the present disclosure.

FIG. 6 is a block diagram of an example computer system 600 that can implement certain aspects of the present disclosure. For example, the computer system 600 can be representative of the first user device 110, the second user device 120, the third user device 130, the fourth user device 140, and/or the computing device 160. The computer system 600 can include a set of instructions 626 for controlling operation of the computer system 600. In some implementations, the computer system 600 can be connected (e.g., networked) to other machines in a Local Area Network (LAN), an intranet, an extranet, a satellite communications system, or the Internet. The computer system 600 can operate in the capacity of a server or a client machine in a client-server network environment, or as a peer machine in a peer-to-peer (or distributed) network environment. As non-limiting examples, the computer system 600 can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 600 is illustrated, the term "machine" shall also be taken to include any collection of machines (e.g., computers) that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random-access memory (DRAM) such as synchronous DRAM (SDRAM), etc.), a static memory 606 (e.g., flash memory, static random-access memory (SRAM), etc.), and a secondary memory 616 (e.g., a data storage device), which communicate with each other via a bus 608.

The processing device 602 represents one or more general-purpose processing devices such as a microprocessor, a microcontroller, a central processing unit, or the like. As non-limiting examples, the processing device 602 can be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute the operations for electronically creating and trading derivative products based on one or more indices relating to volatility.

The computer system 600 can further include a network interface device 622, which is connectable to a network 150. The computer system 600 also can include a video display unit 610, i.e., a display (e.g., a liquid crystal display (LCD), a touch screen, or a cathode ray tube (CRT)), an alphanumeric input device 612 (e.g., a keyboard), a cursor control device 614 (e.g., a mouse), and a signal generation device 620 (e.g., a speaker).

The secondary memory 616 can include a non-transitory storage medium 624 on which is stored one or more sets of instructions 626 for the computer system 600 representing any one or more of the methodologies or functions described herein. For example, the instructions 626 can include instructions for implementing an asset tracking device including a power source and power management system or subsystem for a container or a trailer. The instructions 626 for the computer system 600 can also reside, completely or at least partially, within the main memory 604 and/or within the processing device 602 during execution thereof by the computer system 600, the main memory 604 and the processing device 602 also constituting computer-readable storage media.

While the storage medium 624 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

Figure 7:
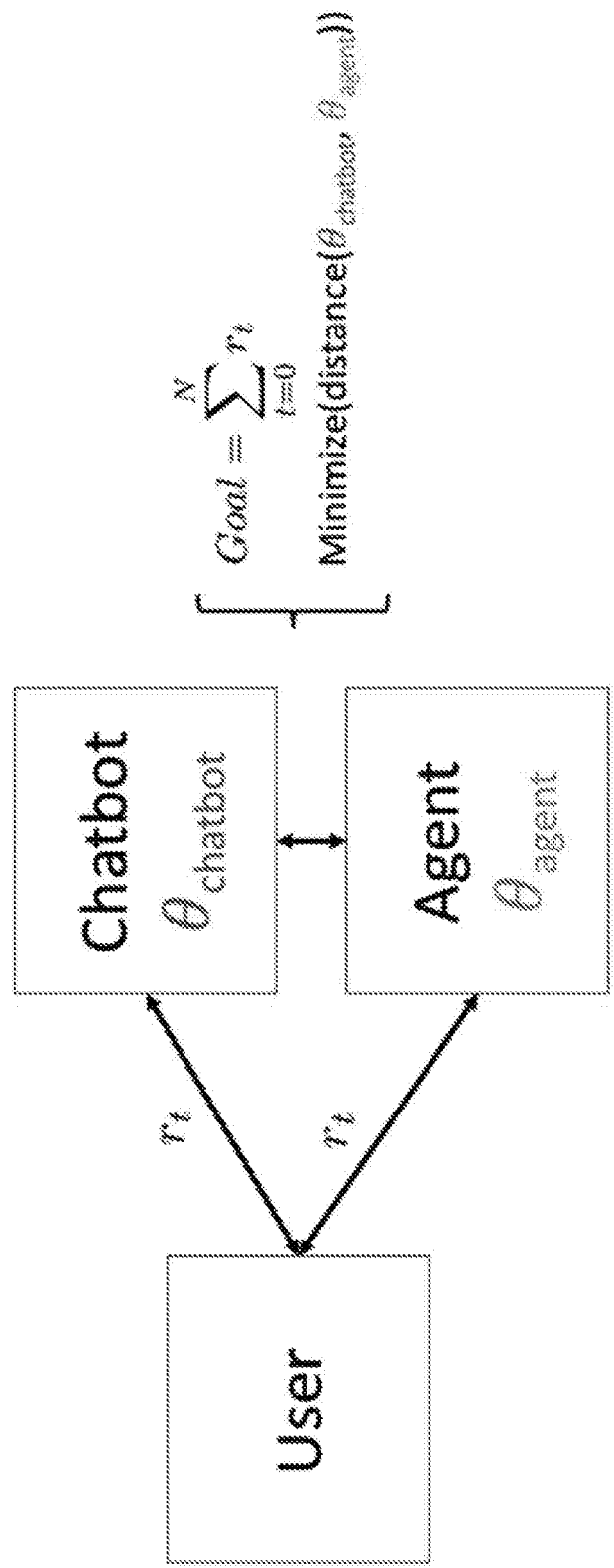
FIG. 7 is a chart illustrating the training of a chatbot for human-chatbot interactions, in accordance with some examples of the present disclosure.

FIG. 7 illustrates an example training of a chatbot for human-chatbot interactions. In some embodiments, the training may involve the system studying a human-human interaction (e.g., conversation between an "Agent" and a "User"). Further, learning obtained from the human-human interaction may be applied to a human-chatbot interaction (e.g., conversation between the "User" and a "Chatbot"). As a non-limiting example, the "User" may be the first user of the first user device 110, the "Agent" may be the second user of the second user device 120, and the "Chatbot" may be the computing device 160. As indicated by the equation (Goal=$\Sigma_{t=0}^{N} r_t$), the goal of the training is to minimize the distance, i.e., time of training the chatbot to essentially behave as a human agent. This may be accomplished by determining trainable parameters from human-human interactions. These interactions may include hundreds of thousands of human-human interactions. Applying the learning ($r_t$) as part of trainable parameters, may also help decrease the training time needed by the chatbot, minimize the duration of a dialog, generate more natural conversation, and/or increase the duration of colloquial conversations, i.e., chit-chat.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describes an example of particular implementation of the use of artificial dialog in accordance with some examples of the present disclosure. This example is intended solely for explanatory purposes and not limitation. In one case, a conversation between two people, Mark and John, is used by a chatbot (e.g., computing device 160) to learn to understand the conversations of humans. Mark is a customer service representative for a large retailer and John is a customer of the retailer. In this scenario, the conversation between Mark and John is a previous recording of a customer service call. Mark receives a call from John and begins by uttering a greeting (e.g., a first input). John expresses frustration (e.g., a first response) with a recent purchase appearing twice on his credit card statement. Recognizing John's frustration and the problem (e.g., the first intent), Mark determines that John would like one of the charges removed from his card. In response, Mark offers to credit the second charge to John's card (e.g., the first action). Because John is pleased with the prompt service and Mark's overall demeanor, he responds by saying, "Thank you very much! I greatly appreciate it!" The chatbot parses each part of the conversation to determine that the customer, John, received proper service. Based on the parsed conversation, the chatbot generates instructions for use in future conversations between a human and a chatbot (e.g., the first one or more trainable parameters).

Using the first trainable parameter(s) and other previously stored trainable parameters, the chatbot is ready to begin conversing with humans. Pedro calls in to customer service center (e.g., the second input) frustrated that he cannot login to his account. Based on the learning from Mark and John's (and other) conversations, the chatbot can determine what Pedro seeks to accomplish (e.g., the second intent). The chatbot outputs a verbal response (e.g., the second action) to Pedro informing him that his password has been reset. Surprised that the chatbot could quickly identify and fix the problem, Pedro exclaims, "Wow! Thanks." The chatbot determines Pedro is satisfied and uses the exchange with Pedro to refine instructions (e.g., the second trainable parameter) for future human-chatbot conversations.

What is claimed is:

1. A method for determining machine learning training parameters, the method comprising:
    receiving, at a processor, a first input from a first user;
    receiving, at the processor, a first response to the first input from a second user;
    determining, by the processor executing a training algorithm, a first intent for the first input based at least in part on the first input and the first response;
    identifying, by the processor executing the training algorithm, a first action based on one or more of the first input, the first response, or the first intent;
    determining, by the processor executing the training algorithm, one or more first trainable parameters based on at least one of: the first input, the first response, the first action, or the first intent;
    determining whether the one or more first trainable parameters are positive or negative;
    updating, by the processor, the training algorithm based on the one or more first trainable parameters;
    receiving, by the processor, a second input from a third user;
    determining, by the processor executing the training algorithm, a second intent for the second input;
    determining, by the processor executing the training algorithm, based at least in part on the second intent, a second action for the second intent;
    transmitting, by the processor, the second action to the third user;
    determining, by the processor executing the training algorithm, one or more second trainable parameters based on at least one of: the second input or the second intent;
    determining whether the one or more second trainable parameters are positive or negative; and
    updating, by the processor, based on the one or more second trainable parameters, the training algorithm,
    wherein determining whether the one or more first trainable parameters are positive or negative comprises:
        assigning a value to each of one or more entries in a survey;
        generating a composite score based on a sum of the values of each of one or more entries; and either:
        determining the one or more first trainable parameters are positive when the composite score of the survey is above a numerical value; or
        determining the one or more first trainable parameters are negative when the composite score of the survey is below the numerical value.

2. The method of claim 1, wherein determining the one or more first trainable parameters further comprises:
    receiving, by the processor, a survey from the second user.

3. The method of claim 1, wherein, when the one or more first trainable parameters are determined to be positive, updating the training algorithm includes programming the training algorithm to:
    select the first response when receiving the first input; and
    select the first action after determining the first intent.

4. The method of claim 1, wherein, when the one or more first trainable parameters are negative, updating the training algorithm includes programming the training algorithm to:
    remove the first response from the training algorithm as a possible response to the first input; and
    remove the first action from the training algorithm as a possible action for the first input.

5. The method of claim 1, wherein, when the one or more second trainable parameters are positive, updating the training algorithm includes programming the training algorithm to:
    select a second response in reply to the second input; and
    select the second action after determining second intent.

6. The method of claim 5, wherein, when the one or more trainable second parameters are negative, updating the training algorithm includes programming the training algorithm to:
    remove the second response from the training algorithm as a possible response to the second input; and
    remove the second action from the training algorithm as a possible action for the second input.

7. The method of claim 5, wherein:
    the one or more first trainable parameters comprise data including at least one of the first input, the first response, the first intent, the first action, previous trainable parameters, and one or more instructions, and
    the one or more second trainable parameters comprise data including at least one of the second input, the second response, the second intent, the second action, previous trainable parameters, and the one or more instructions.

8. The method of claim 1 further comprising:
    receiving, by the processor, a third input from a fourth user;
    determining, by the processor executing the training algorithm, a third intent for the third input;
    determining, by the processor executing the training algorithm, a third action based on the third intent;
    transmitting, by the processor, the third action to the fourth user;
    determining, by the processor executing the training algorithm, one or more third trainable parameters based on at least one of: the third input or the third intent; and
    updating, by the processor, based on the one or more third trainable parameters, the training algorithm.

9. A method for determining a machine learning training parameter, the method comprising:
    receiving, at a processor, a first input;
    receiving, at the processor, a first response to the first input;
    determining, by the processor executing a training algorithm, a first intent for the first input based at least in part on the first input and the first response;
    identifying, by the processor executing the training algorithm, a first action based on one or more of the first input, the first response, or the first intent;
    determining, by the processor executing the training algorithm, based on at least one of:

the first input, the first response, or the first intent, one or more first trainable parameters;
determining whether the first one or more trainable parameters are positive or negative;
storing, in a memory, at least one of the first action, the first input, the first response, the first intent, and the one or more first training parameters;
updating, based on the one or more first trainable parameters, the training algorithm; and
when the one or more first trainable parameters are negative, updating the training algorithm includes programming the training algorithm to:
remove the first response from the training algorithm as a possible response to the first input, and
remove the first action from the training algorithm as a possible action for the first input.

10. The method of claim 9, wherein:
when the one or more first trainable parameters are positive, updating the training algorithm includes programming the training algorithm to:
select the first response when receiving the first input, and
select the first action after determining the first intent.

11. The method of claim 9, further comprising:
receiving, at the processor, a second input from a first user;
determining, by the processor executing the training algorithm, and based at least in part on the second input, a second intent for the second input;
determining, by the processor executing the training algorithm, based at least in part on the second intent, a second action for the second intent;
transmitting, by the processor and to the first user, the second action;
determining, by the processor executing the training algorithm, based on at least one of: the second input or the second intent, one or more second trainable parameters;
determining whether the second one or more trainable parameters are positive or negative; and
updating, based on the one or more second trainable parameters, the training algorithm.

12. The method of claim 11, wherein:
when the one or more second trainable parameters are positive, updating the training algorithm includes programming the training algorithm to:
select a second response when receiving the second input, and
select the second action after determining the second intent; or
when the one or more second trainable parameters are negative, updating the training algorithm includes programming the training algorithm to:
remove the second response from the training algorithm as a possible response for the second input, and
remove the second action from the training algorithm as a possible action for the second input.

13. The method of claim 11, further comprising:
receiving, at the processor, a third input from a second user;
determining, by the processor executing the training algorithm, and based at least in part on the third input, a third intent for the third input;
determining, by the processor executing the training algorithm, based at least in part on the third intent, a third action for the third intent;
transmitting, by the processor and to the second user, the third action;
determining, by the processor executing the training algorithm, based on at least one of: the third input or the third intent, one or more third trainable parameters; and
updating, by the processor, the training algorithm.

14. The method of claim 13, wherein:
when the one or more third trainable parameters are positive, updating the training algorithm includes programming the training algorithm to:
select a third response when receiving the third input, and
select the third action after determining the third intent; or
when the one or more third trainable parameters are negative, updating the training algorithm includes programming the training algorithm to:
remove the third response from the training algorithm as a possible response to the third input, and
remove the third action from the training algorithm as a possible action for the third action.

15. The method of claim 9, further comprising:
receiving, by the processor, a survey; and
wherein determining whether the one or more first trainable parameters are positive or negative comprises:
assigning a value to each of one or more entries of the survey;
generating a composite score based on a sum of the values of each of one or more entries; and
determining the one or more first trainable parameters are positive based at least in part on the composite score of the survey being above a numerical value; or
determining the one or more first trainable parameters are negative based at least in part on the composite score of the survey being below the numerical value.

16. A system for determining machine learning training parameters comprising:
one or more processors; and
at least one memory in communication with the one or more processors and storing computer program code that, when executed by the one or more processors, is configured to cause the system to:
receive a first input from a first user, the first input being an audio excerpt entered by the first user using a first user device;
receive a first response to the first input from a second user, the first response being an audio excerpt entered by the second user using a second user device;
determine, by executing a training algorithm, a first intent for the first input based at least in part on the first input and the first response;
identify, by executing the training algorithm, a first action based on one or more of the first input, the first response, or the first intent;
determine, by executing the training algorithm, based on at least one of: the first input, the first response, the first action, or the first intent, one or more first trainable parameters;
determine whether the one or more first trainable parameters are positive or negative;
update based on the one or more first trainable parameters, the training algorithm;
receive a second input from a third user, the second input being an audio excerpt entered by the third user using a third user device;

determine, by executing the training algorithm, and based at least in part on the second input, a second intent for the second input;

determine, by executing the training algorithm, based at least in part on the second intent, a second action for the second intent;

transmit the second action to the third user;

determine, by executing the training algorithm, based on at least one of: the second input or the second intent, one or more second trainable parameters;

determine whether the one or more second trainable parameters are positive or negative;

update based on the one or more second trainable parameters, the training algorithm; and when the one or more first trainable parameters are negative, updating the training algorithm includes programming the training algorithm to:

remove the first response from the training algorithm as a possible response to the first input; and remove the first action from the training algorithm as a possible action for the first input.

17. The system of claim 16, wherein:

when the one or more first trainable parameters are positive, updating the training algorithm includes programming the training algorithm to:

select the first response when receiving the first input; and select the first action after determining the first intent.

18. The system of claim 16, wherein:

when the one or more second trainable parameters are positive, updating the training algorithm includes programming the training algorithm to:

select a second response when receiving the second input; and select the second action after determining the second intent; or when the one or more second trainable parameters are negative, updating the training algorithm includes programming the training algorithm to:

remove the second response from the training algorithm as a possible response to the second input; and remove the second action from the training algorithm as a possible action for the second input.

19. The system of claim 16, wherein the system is further configured to:

receive a third input from a fourth user, the third input being an audio excerpt entered by the fourth user using a fourth user device;

determine, by executing the training algorithm, a third intent for the third input;

determine, by executing the training algorithm, based on the third intent a third action;

transmit the third action to the fourth user;

determine, by executing the training algorithm, based on at least one of: the third input or the third intent, one or more third trainable parameters; and update based on the one or more third trainable parameters, the training algorithm.

* * * * *